US012471197B2

(12) United States Patent
Guo et al.

(10) Patent No.: US 12,471,197 B2
(45) Date of Patent: Nov. 11, 2025

(54) METHOD AND SYSTEM FOR LIGHTING INTERACTION

(71) Applicant: HARMAN INTERNATIONAL INDUSTRIES, INCORPORATED, Stamford, CT (US)

(72) Inventors: Shufen Guo, Guangdong (CN); Dishan Song, Guangdong (CN); Rongjian Huang, Guangdong (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 292 days.

(21) Appl. No.: 18/020,853

(22) PCT Filed: Aug. 21, 2020

(86) PCT No.: PCT/CN2020/110460
§ 371 (c)(1),
(2) Date: Feb. 10, 2023

(87) PCT Pub. No.: WO2022/036676
PCT Pub. Date: Feb. 24, 2022

(65) Prior Publication Data

US 2023/0328867 A1 Oct. 12, 2023

(51) Int. Cl.
*H05B 47/19* (2020.01)
*H05B 47/155* (2020.01)
(Continued)

(52) U.S. Cl.
CPC ........... *H05B 47/19* (2020.01); *H05B 47/155* (2020.01); *H05B 47/165* (2020.01); *H05B 47/17* (2020.01)

(58) Field of Classification Search
CPC ........... A61M 15/02; A61M 2202/025; H05H 1/2406; H05H 1/2443; H05H 2245/30;
(Continued)

(56) References Cited

U.S. PATENT DOCUMENTS 5,602,908 A 2/1997 Fan
8,275,144 B2 * 9/2012 Logvinov ............. H04R 27/00 381/124

(Continued)

FOREIGN PATENT DOCUMENTS

CN 102461336 A 5/2012
CN 105049991 A 11/2015

(Continued)

OTHER PUBLICATIONS

Extended European Search Report dated Apr. 12, 2024 for European Patent Application No. 20949885.6, 11 pages.

(Continued)

*Primary Examiner* — Renan Luque
(74) *Attorney, Agent, or Firm* — BROOKS KUSHMAN P.C.

(57) ABSTRACT

The disclosure describes a method for a real-time lighting interaction between a remote controlling device and a speaker device. The method comprises receiving a user request via the remote controlling device and determining whether the user request is for selecting a first lighting pattern from a plurality of lighting patterns included in a first mode or a second lighting pattern from a plurality of lighting patterns included in a second mode. The method further generates and communicates first parameter data associated with the selected lighting pattern or second parameter data associated with the selected lighting pattern, based on the determined user request. The method adjusts a light show on the speaker device to output the first output lighting pattern
(Continued)

associated with the first parameter data or the second output lighting pattern associated the second parameter data, in response to receiving the first parameter data or the second parameter data.

19 Claims, 4 Drawing Sheets

(51) Int. Cl.

| | |
|---|---|
| ***H05B 47/165*** | (2020.01) |
| ***H05B 47/17*** | (2020.01) |

(58) Field of Classification Search

CPC .................. H05B 45/355; H05B 45/30; H05B 47/155–17; H05B 47/175; H05B 47/19–1975; H05B 45/20; H05B 47/12; H05B 47/195; H05B 47/197; F21V 23/0442; F21V 33/0056; F21Y 2115/10; G06F 3/16; G06F 3/167; G10H 1/40; G10H 2220/081; G11B 27/28; G11B 27/34; H04B 2203/5408; H04B 2203/5445; H04B 2203/545; H04B 2203/5454; H04B 3/54; H04R 1/028; H04R 1/20; H04R 2201/403; H04R 2227/003; H04R 2420/07; H04R 2499/15; H04R 27/00; H04R 3/12; Y02B 20/40

See application file for complete search history.

(56) References Cited

U.S. PATENT DOCUMENTS

| | | | | |
|---|---|---|---|---|
| 9,453,627 | B1 | 9/2016 | Chen | |
| 9,832,555 | B2 * | 11/2017 | Saijo | F21V 23/0442 |
| 2016/0205748 | A1 | 7/2016 | Lashina et al. | |
| 2016/0302286 | A1 * | 10/2016 | Kim | G06F 3/16 |
| 2017/0340984 | A1 | 11/2017 | Lee | |
| 2019/0230772 | A1 * | 7/2019 | Reiss | H04L 12/2827 |
| 2019/0274206 | A1 * | 9/2019 | Altamura | F21S 10/02 |
| 2021/0195711 | A1 * | 6/2021 | Honda | H05B 47/12 |

FOREIGN PATENT DOCUMENTS

| | | | |
|---|---|---|---|
| CN | 105659701 | A | 6/2016 |
| CN | 208540131 | U | 2/2019 |
| CN | 110770692 | A | 2/2020 |
| CN | 111277928 | A | 6/2020 |
| EP | 3671431 | A1 | 6/2020 |

OTHER PUBLICATIONS

International Search Report dated May 19, 2021 for PCT Appn. No. PCT/CN2020/110460 filed Aug. 21, 2020, 11 pgs.

Chinese Office Action for CN Application No. 202080104060.1 filed Feb. 8, 2023, dated Dec. 31, 2024, 21 pages.

* cited by examiner

METHOD AND SYSTEM FOR LIGHTING INTERACTION

CROSS-REFERENCE TO RELATED APPLICATION

This application is the U.S. national phase of PCT Application No. PCT/CN2020/110460 filed on Aug. 21, 2020, the disclosure of which is incorporated in its entirety by reference herein.

TECHNICAL FIELD

The present disclosure relates to a method and a system for lighting interaction, and specifically relates to a method and a system for a real-time lighting interaction between a remote controlling device and a speaker device.

BACKGROUND

With the diversification of people's entertainment, the requirements for home entertainment facilities, such as an audio equipment (party speaker) are getting higher and higher. In addition to the function of playing audio, the current audio equipment is also provided with a lighting system for displaying lights on it to provide users with a better party atmosphere. However, in the existing speaker market, due to the latency issue, the lighting display of the existing audio equipment is preset, and users cannot improvise the party lighting atmosphere.

Therefore, it is necessary to provide an improved real-time interaction technology to provide users with fun for interaction and to bring users a better experience.

SUMMARY

According to one aspect of the disclosure, a method for a real-time lighting interaction between a remote controlling device and a speaker device is provided. The method comprises receiving a user request via the remote controlling device. Then, the method determines whether the user request is for selecting a first lighting pattern from a plurality of lighting patterns included in a first mode or a second lighting pattern from a plurality of lighting patterns included in a second mode. The method further generates and communicates first parameter data associated with the selected lighting pattern in the first mode or second parameter data associated with the selected lighting pattern in the second mode, based on the determined user request. Then, the method adjusts a light show on the speaker device to output the first output lighting pattern associated with the first parameter data or the second output lighting pattern associated the second parameter data, in response to receiving the first parameter data or the second parameter data.

Further, the method may comprise continuing to output the first output lighting pattern in response to receiving the first parameter data.

Further, the method may comprise outputting the second output lighting pattern in a first threshold time in response to receiving the second parameter data, and resuming displaying the latest first output lighting pattern of the first mode when the first threshold time expires.

Further, the user request may be input via a user interface on the remote controlling device. The first lighting pattern in the first mode may be selected by short pressing or sliding on the user interface, and the second lighting pattern in the second mode may be selected by single short pressing, long pressing or continuously short pressing on the user interface.

Further, when the first lighting pattern in the first mode is selected by short pressing or sliding, the first parameter data may be generated. The first parameter data includes a first pattern parameter associated with the selected first lighting pattern.

Further, when the second lighting pattern in the second mode is selected by single short pressing, the second parameter data may be generated. The second parameter data includes a time parameter associated with the first threshold time and a second pattern parameter associated with the selected second lighting pattern.

Further, when the second lighting pattern in the second mode is selected by long pressing, the second parameter data may be generated. The second parameter data includes a time parameter associated with the first threshold time, a speed parameter indicating a lighting speed of the second output lighting pattern and a second pattern parameter associated with the selected second lighting pattern.

Further, when the second lighting pattern in the second mode is selected by continuously short pressing, the second parameter data may be generated. The second parameter data includes a time parameter associated with the first threshold time, a second pattern parameter associated with the selected second lighting pattern and a rhythm parameter for the continuously short pressing.

Further, the method may comprise communicating a stop command to the speaker device to stop displaying the second output lighting pattern and resuming displaying the latest first output lighting pattern of the first mode, in response to releasing the long pressing.

Further, if the speaker device does not receive the stop command and the second parameter data generated by the long press has not been received by the speaker within a second time threshold, the speaker device automatically stops displaying the second output lighting pattern and resumes displaying the latest first output lighting pattern of the first mode.

Further, if the second lighting pattern in the second mode is selected by continuously short pressing, the remote controlling device communicates the rhythm parameter to the speaker device at every predefined time interval, the speaker device automatically adjusts the second output lighting pattern based on the rhythm parameter included in the second parameter data. The second pattern parameter may be associated with a light shape, a light color, a light state, a light theme or a combination thereof.

According to another aspect of the present disclosure, a system for lighting interaction is provided. The system may comprise a remote controlling device and a speaker device. The remote controlling device is configured to receive a user request; determine whether the user request is for selecting a first lighting pattern from a plurality of lighting patterns included in a first mode or a second lighting pattern from a plurality of lighting patterns included in a second mode; and generate and communicate first parameter data associated with the selected lighting pattern in the first mode or second parameter data associated with the selected lighting pattern in the second mode, based on the determined user request. The speaker is configured to adjust a light show on the speaker device to output the first output lighting pattern associated with the first parameter data or the second output lighting pattern associated the second parameter data, in response to receiving the first parameter data or the second parameter data.

Figure 1:
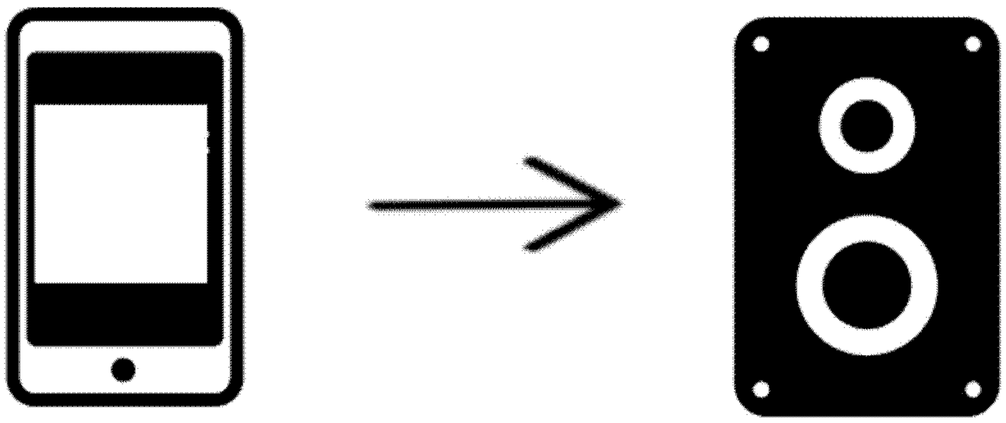
FIG. 1 illustrates a schematic diagram for a lighting interaction system including a controlling device and a speaker device, such as a party speaker, in accordance with one or more embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where similar designations denote similar elements.

DETAILED DESCRIPTION OF THE PREFERRED EMBODIMENTS

Examples will be provided below for illustration. The descriptions of the various examples will be presented for purposes of illustration, but are not intended to be exhaustive or limited to the embodiments disclosed. Many modifications and variations will be apparent to those of ordinary skill in the art without departing from the scope and spirit of the described embodiments.

FIG. 1 illustrates a schematic diagram for a lighting interaction system in accordance with one or more embodiments of the present disclosure. The lighting interaction system may include a remote controlling device and an audio equipment, such as a speaker device which may be a party speaker. A user who wants to control the lighting atmosphere in the party may remotely control the party speaker via the controlling device. The controlling device may be a portable smart device loaded with a lighting interaction application. For example, the portable smart device may include a smart mobile phone, a tablet computer, a media tablet and a portable computer, and any device which may be loaded with applications. The controlling device may generate and encode command data based on the user input and communicate the data to the party speaker in real time so as to control the light show on the party speaker. The party speaker receives and decodes the command data, and displays the corresponding light show in real time based on the decoded command data.

Figure 2:
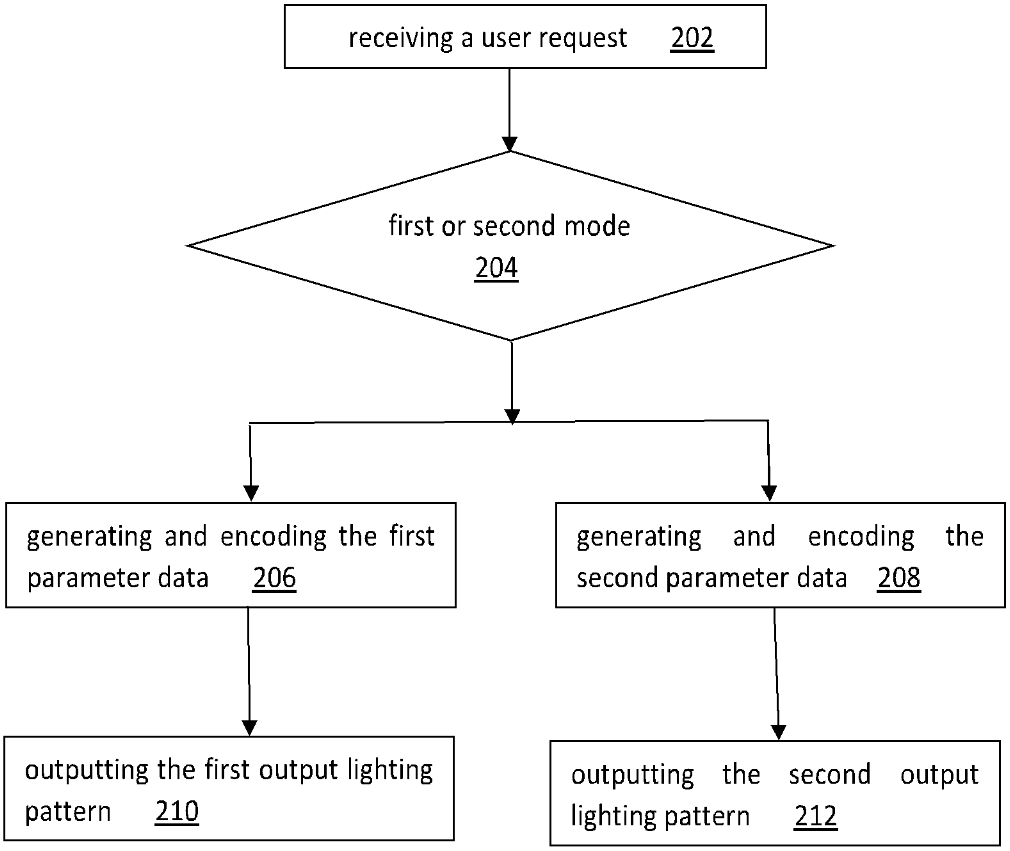
FIG. 2 illustrates a method flowchart for lighting interaction in the lighting interaction system in accordance with one or more embodiments of the present disclosure.

FIG. 2 illustrates a method flowchart for lighting interaction in the lighting interaction system in accordance with one or more embodiments of the present disclosure.

Figure 3:
FIG. 3 illustrates a schematic view which shows an example of a user interface on the controlling device.

At block 202, the controlling device receives a user request. The user request may be input by a user via a user interface on the controlling device. FIG. 3 illustrates a schematic view which shows an example of a user interface on the controlling device. The skilled person in the art would perceive that the illustrated user interface is presented for purposes of illustration, but is not intended to be exhaustive or limited to it. It is possible to have modifications and variations according to various requirements.

At block 204, the control device determines whether the user request is for selecting a first lighting pattern from a plurality of lighting patterns included in a first mode or a second lighting pattern from a plurality of lighting patterns included in a second mode. For example, referring to the exampled interface shown in FIG. 3, the first mode may be a normal mode and the second mode may be a free-style mode. For example, the first mode may include a plurality of lighting patterns, which may be selected by the user via selecting the corresponding icons, such as icons of Ring On, Flashing On, Static Color, Flash On, Light1 to Light5 as illustrated shown in FIG. 3. For example, the second mode may include a plurality of lighting patterns, such as SOLO1 to SOLO9 as illustrated shown in FIG. 3. The lighting patterns of the free-style mode have higher priority than the lighting patterns of the normal mode.

If the control device determines the user selects one of the lighting patterns in the first mode, then at block 206, the control device generates and encodes first parameter data indicating parameters of the selected lighting pattern. For example, via the user interface, the user may select one lighting pattern from the lighting patterns in the first mode by short pressing or sliding one of the icons on the user interface. When the lighting pattern in the normal mode is selected by short pressing or sliding, the corresponding parameter data for the normal mode is generated. The parameter data may include pattern parameters associated with the selected lighting pattern in the normal mode.

For example, if the icon of Ring On is short pressed, then the parameter data related to a light shape is generated. If the icon of Flash On is short pressed then the parameter data related to a light state is generated. Moreover, the parameter data related to a color may be generated if the icon of Static Color or Color Loop is selected by sliding, for example. When one of Light1-Light5 is selected, the parameter data related to a light theme may be generated which may respectively correspond to the different lighting patterns. For example, Light1-Light5 may be associated with one of the lighting patterns including such as Club, Neon, Rock, Flow and Ripples. The lighting patterns in the normal mode may be pre-selected by the user before the party speaker operates and they also may be changed by the user when the party speaker is operating.

Then, the controlling device may communicate the first parameter data to the speaker device. At block 210, the speaker device receives and decodes the communicated first parameter data, and adjusts the light show to output the lighting pattern associated with the first parameter data for the normal mode. For example, the party speaker keeps outputting the lighting patterns associated with the first parameter data in response to receiving the first parameter data for the normal mode, until new parameter data is received.

If the control device determines that the user selects one of the lighting patterns in the second mode, i.e., one of the lighting patterns in the free-style mode, then at block 208, the control device generates and encodes second parameter data including parameters associated with the selected lighting pattern. For example, via the user interface, the user may select one lighting pattern from the lighting patterns in the free-style mode by single short pressing, long pressing or continuously short pressing on the user interface. For purposes of illustration, FIG. 3 shows an example of nine lighting patterns in the free-style mode, such as SOLO1-SOLO9. Each of SOLO1-SOLO9 may be associated with different lighting patterns which may comprise light shapes, light colors, light states, light themes, light speed or combination thereof.

Then, the controlling device may communicate the generated and encoded second parameter data to the speaker. At block 212, the speaker device receives and decodes the communicated second parameter data, and adjusts the light show to output the second lighting pattern associated with the parameter data for the free-style mode. The speaker device may output the corresponding output lighting pattern in a threshold time in response to receiving the parameter data, and resuming displaying the latest output lighting pattern of the normal mode when the threshold time expires. For example, in response to the parameter data, the speaker decodes the parameter data and shows the selected lighting pattern associated with the parameter data temporarily and overwrites the current lighting pattern of the normal mode during the threshold time period, and then returns to display the lighting pattern of the normal mode until receiving new parameter data.

When the lighting pattern in the free-style mode is selected, the second parameter data associated with the selected lighting pattern in the free-style may be generated. The user may use different manners to select one of the lighting patterns in the free-style mode. The generated parameter data may be different based on the different manners, and then the speaker device will show the lighting pattern differently according to the different parameter data.

In one example, when one free-style lighting pattern (such as one of SOLO1-SOLO9) is selected by single short pressing, the second parameter data is generated. In this case, the parameter data includes a time parameter associated with a displaying threshold time and a pattern parameter associated with the selected free-style lighting pattern. The time parameter may indicate a duration for displaying the selected lighting pattern and may be varied as the different lighting pattern is selected. In response to receiving the parameter data, the speaker device decodes the parameter data, and uses the output lighting pattern corresponding to the selected lighting pattern to overwrite a current lighting pattern of the normal mode within the displaying threshold time. When the displaying threshold time expires, the speaker device returns to show the lighting pattern of the normal mode that is the latest lighting displaying of the normal mode before overwriting.

In one example, when one free-style lighting pattern (such as one of SOLO1-SOLO9) of the free-style mode is selected by long pressing, the second parameter data is generated. In this case, the parameter data includes a speed parameter and a pattern parameter associated with the selected free-style lighting pattern. The speed parameter may indicate the acceleration for displaying the selected lighting pattern. During the long pressing, the controlling device communicates the parameter data to the speaker every time interval, such as every 3 seconds, to indicate displaying with an increasing speed. Once releasing the long pressing, the controlling device may send a stop command to the speaker device immediately. In response to receiving the parameter data, the speaker device decodes the parameter data, and uses the selected lighting pattern with speed-increasing displaying to overwrite a current lighting displaying of the normal mode. For example, if the lighting shape is a light ring, then the light ring may start from a slow speed to the maximum speed in a certain time. When receiving a stop command, the speaker returns to the lighting displaying that is the latest lighting displaying of the normal mode before overwriting. If the stop command is not received by the speaker and the parameter data generated by the long press has not been received by the speaker within a threshold time such as within five seconds, the speaker device automatically slows down and stops displaying the output lighting pattern corresponding to the selected lighting pattern of the free-style pattern and resumes displaying the latest output lighting pattern corresponding to the selected lighting pattern of the normal mode.

In one example, when one free-style lighting pattern (such as one of SOLO1-SOLO9) of the free-style mode is selected by continuously short pressing, the second parameter data is generated. In this case, the generated parameter data includes a time parameter associated with the displaying threshold time, a pattern parameter associated with the selected free-style lighting pattern and a rhythm parameter for the continuously short press. The time parameter may indicates the duration for displaying the selected lighting pattern and may be varied as the different lighting pattern is selected. When the user continuously shot presses on one icon or shot presses multiple icons in a switching way, the controlling device may calculate a rhythm of the user action, and generate the rhythm parameter to indicate the rhythm for pressing. Then, the controlling device may send the generated parameter data including the time parameter, the pattern parameter and the rhythm parameter to the speaker device at regular intervals. In response to receiving the parameter data, the speaker device decodes the parameter data, and uses the selected lighting pattern to overwrite a current lighting displaying of the normal mode at the rhythm specified by the rhythm parameter.

For example, the controlling device detects the continuously shot pressing at t1, t2, t3, t4 . . . tn at regular interval (e.g. 50 ms), then the controlling device calculates the rhythm of the user action as 50 ms and accordingly generates the rhythm parameter to indicate the rhythm. The controlling device sends the generated parameter data including the time parameter, the pattern parameter and the rhythm parameter (such as indicating the rhythm of 50 ms) to the speaker at regular intervals (T). The regular intervals T may be predefined which is preferable as 200 ms. When receiving the parameter data, the speaker decodes the parameter data and then displays the lighting pattern selected by each of continuously short pressings at the rhythm specified by the rhythm parameter, i.e., at the rhythm of 50 ms. Each display of the selected lighting pattern may be performed within the displaying threshold time indicated by the time parameter. When the displaying threshold time expires and there is no other new command data, the speaker returns to display the lighting pattern of the normal mode that is the latest lighting pattern before overwriting.

Figure 4A:
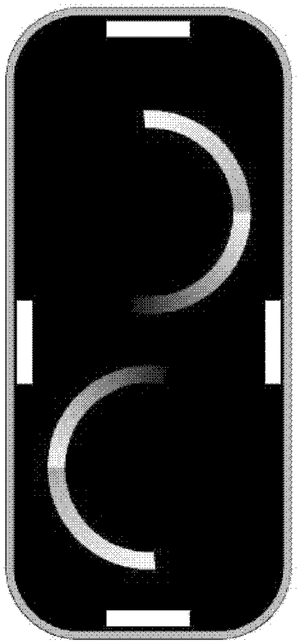
FIG. 4A-4E illustrates different lighting patterns in different lighting theme which may match the different music.

FIGS. 4A-4E illustratively shows different lighting patterns in different lighting theme which may match the different styles of music. FIG. 4A shows an example of a display of lighting pattern on the speaker, which corresponds to a light theme of Rock. The Rock theme may match the slow to fast style music. For example, the Flash LED on the speaker may flash once when a low frequency beat is detected. By the RGB LED on the speaker, an animation may be shown which moves faster when music waveform level is higher and moves slower when music waveform level is lower during a song is playing. Moreover, the speaker may change a hue of light by time.

Figure 4B:
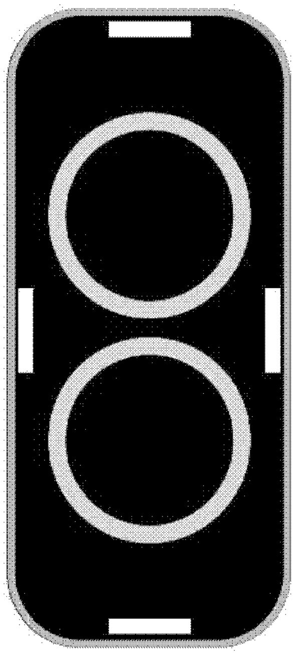

FIG. 4B shows an example of a display of lighting pattern on the speaker, which corresponds to a light theme of Neno. The Neon theme may have a fast, dynamic and good match for a pop/rock dancing music. For example, the Flash LED on the speaker may flash once when a low frequency beat is detected. By the RGB LED on the speaker, the speaker may show a full LED ring when the music waveform level is higher and show a quarter or half LED ring when the music waveform level is lower during a song is playing. Moreover, the speaker may change a hue of light by time.

Figure 4C:
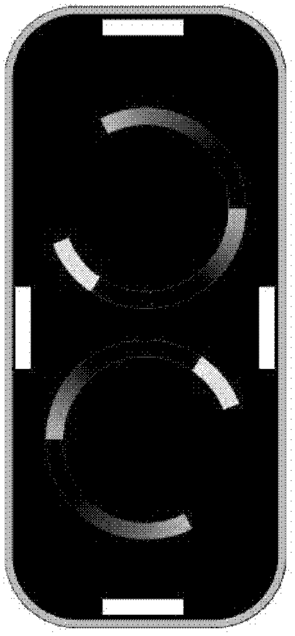

FIG. 4C shows an example of a display of lighting pattern on the speaker, which corresponds to a light theme of Club. The Club theme may have a fast, dynamic and good match for a pop/rock dancing music. For example, the Flash LED on the speaker may flash once when a low frequency beat is detected. By the RGB LED on the speaker, the speaker may show a full LED ring when the music waveform level is higher and show only a part of ring when the music waveform level is lower during a song is playing. Moreover, the speaker may change a hue of light by time.

Figure 4D:
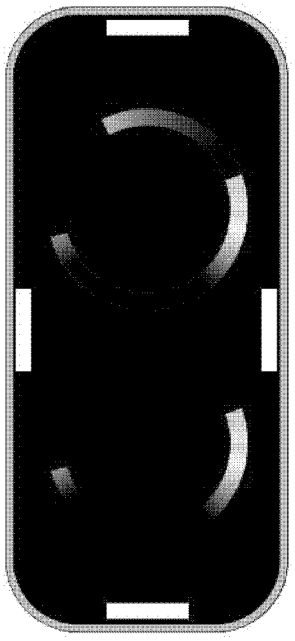

FIG. 4D shows an example of a display of a lighting pattern on the speaker, which corresponds to a light theme of Flow. The Flow theme may match the slow to fast style music. For example, the Flash LED on the speaker may flash once when a low frequency beat is detected. By the RGB LED on the speaker, an animation may be shown which moves faster when a music waveform level is higher and moves slower when a music waveform level is lower during a song is playing. Moreover, the speaker may change a hue of light by time. The lighting pattern may be shown in randomly change directions, such as up-down, left-right, left top-right bottom and vice versa.

Figure 4E:
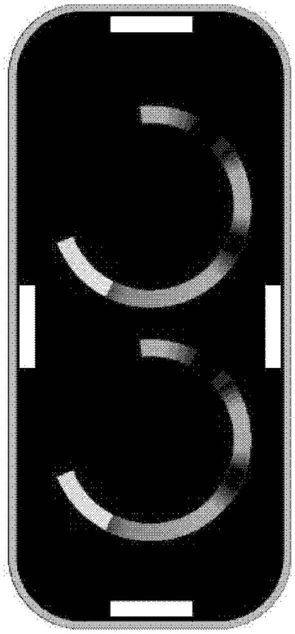

FIG. 4E shows an example of a display of lighting pattern on the speaker, which corresponds to a light theme of Ripples. The Ripples theme may match the slow to fast style music. For example, the Flash LED on the speaker may flash once when a low frequency beat is detected. By the RGB LED on the speaker, an animation may be shown which moves faster when the music waveform level is higher and moves slower when the waveform music level is lower during a song is playing. Moreover, the speaker may change a hue of light by time. The lighting pattern may change direction in clockwise or counter-clockwise when a very high waveform peak is detected. For example, the ring may be divided into a number of segments, the numbers of segments can be range from 3~8, randomly.

The light show interaction method and system herein provide an opportunity to link the controlling device and the speaker together with the real time lighting feedback on speaker, which enhances the user's experience.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Although the terms "first" and "second" may be used herein to describe various elements, these elements are not be limited by these terms. These terms are only used to distinguish one element from another. For example, a first element could be termed a second element, and, similarly, a second element could be termed a first element, without departing from the scope of the appended claims.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

It will be apparent to those skilled in the art that various modifications and variations can be made without departing from the scope of the appended claims. The present disclosure covers all modifications and variations within the scope of the appended claims and their equivalents.

What is claimed is:

1. A method for a real-time lighting interaction between a remote controlling device and a speaker device, the method comprising:

receiving a user request via the remote controlling device;

determining the user request for selecting a first lighting pattern from a plurality of lighting patterns included in a first mode or a second lighting pattern from a plurality of lighting patterns included in a second mode;

generating and communicating first parameter data associated with the selected first lighting pattern or second parameter data associated with the selected second lighting pattern, based on the determined user request; and adjusting a light show on the speaker device to output a first output lighting pattern associated with the first parameter data or a second output lighting pattern associated the second parameter data, in response to receiving the first parameter data or the second parameter data, wherein the adjusting the light show further comprising:

outputting the second output lighting pattern in a first threshold time in response to receiving the second parameter data and resuming to display a latest first output lighting pattern of the first mode when the first threshold time expires.

2. The method according to claim 1, wherein the adjusting the light show further comprising:

continuing to output the first output lighting pattern in response to receiving the first parameter data.

3. The method according to claim 1, wherein the user request is input via a user interface on the remote controlling device.

4. The method according to claim 3, wherein the first lighting pattern in the first mode is selected by one of short pressing or sliding on the user interface, and the second lighting pattern in the second mode is selected by single short pressing, long pressing or continuously short pressing on the user interface.

5. The method according to claim 4, wherein the method further comprising:

responsive to the first lighting pattern in the first mode being selected by short pressing or sliding, generating the first parameter data including a first pattern parameter associated with the selected first lighting pattern.

6. The method according to claim 4, wherein the method further comprising:

responsive to the second lighting pattern in the second mode being by single short pressing, generating the second parameter data including a time parameter associated with the first threshold time and a second pattern parameter associated with the selected second lighting pattern;

responsive to the second lighting pattern in the second mode being selected by long pressing, generating the second parameter data including a time parameter associated with the first threshold time, a speed parameter indicating a lighting speed of the second output lighting pattern and a second pattern parameter associated with the selected second lighting pattern; or responsive to the second lighting pattern in the second mode being selected by continuously short pressing, the second parameter data is generated including a time parameter associated with the first threshold time, a second pattern parameter associated with the selected second lighting pattern and a rhythm parameter for the continuously short pressing.

7. The method according to claim 6, wherein the method further comprising:

communicating a stop command to the speaker device to stop displaying the second output lighting pattern and resuming to display the latest first output lighting pattern of the first mode, in response to releasing the long pressing.

8. The method according to claim 7, wherein the method further comprising:

responsive to the speaker device does not receiving the stop command and the second parameter data generated by the long press not being received within a second time threshold, the speaker device automatically stopping to display the second output lighting pattern and resuming to display the latest first output lighting pattern of the first mode.

9. The method according to claim 6, wherein the method further comprising:

responsive to the second lighting pattern in the second mode being selected by continuously short pressing, communicating, via the remote controlling device, the rhythm parameter to the speaker device at every predefined time interval, automatically adjusting, via the speaker device, the second output lighting pattern based on the rhythm parameter included in the second parameter data.

10. The method according to claim 7, wherein the second pattern parameter is associated with a light shape, a light color, a light state, a light theme or a combination thereof.

11. A system for a real-time lighting interaction, the system comprising:

a remote controlling device configured to:

receive a user request;

determine whether the user request corresponds to a first lighting pattern from a plurality of lighting patterns included in a first mode or to a second lighting pattern from a plurality of lighting patterns included in a second mode; and generate and communicate first parameter data associated with the selected first lighting pattern in the first mode or second parameter data associated with the selected second lighting pattern in the second mode, based on the determined user request; and a speaker device configured to:

adjust a light show on the speaker device to output a first output lighting pattern associated with the first parameter data or a second output lighting pattern associated the second parameter data, in response to receiving the first parameter data or the second parameter data, wherein the speaker device is further configured to:

continuously output the first output lighting pattern in response to receiving the first parameter data; or output the second output lighting pattern in a first threshold time in response to receiving the second parameter data, and resume displaying the latest first output lighting pattern of the first mode when the first threshold time expires.

12. The system according to claim 11, wherein the first lighting pattern in the first mode is selected by short pressing or sliding on a user interface of the remote controlling device, and the second lighting pattern in the second mode is selected by one of single short pressing, long pressing or continuously short pressing on the user interface.

13. The system according to claim 12, wherein the remote controlling device is further configured to generate the first parameter data when the first lighting pattern in the first mode is selected by short pressing or sliding, wherein the first parameter data includes a first pattern parameter associated with the selected first lighting pattern.

14. The system according to claim 12, wherein the remote controlling device is further configured to:

generate the second parameter data when the second lighting pattern in the second mode is selected by single short pressing, wherein the second parameter data includes a time parameter associated with the first threshold time and a second pattern parameter associated with the selected second lighting pattern;

generate the second parameter data when the second lighting pattern in the second mode is selected by long pressing, the second parameter data includes a time parameter associated with the first threshold time, a speed parameter indicating a lighting speed of the second output lighting pattern and a second pattern parameter associated with the selected second lighting pattern; or generate the second parameter data when the second lighting pattern in the second mode is selected by continuously short pressing, wherein the second parameter data includes a time parameter associated with the first threshold time, a second pattern parameter associated with the selected second lighting pattern and a rhythm parameter for the continuously short pressing.

15. The system according to claim 14, wherein the remote controlling device is further configured to communicate a stop command to the speaker device, in response to releasing the long pressing; and the speaker device is further configured to stop displaying the second output lighting pattern and resume displaying the latest first output lighting pattern of the first mode, based on the stop command.

16. The system according to claim 15, wherein in response to the speaker device not receiving the stop command and to the second parameter data generated by the long press not being received within a second time threshold, the speaker device automatically stops displaying the second output lighting pattern and resumes displaying the latest first output lighting pattern of the first mode.

17. The system according to claim 14, wherein in response to the second lighting pattern in the second mode being selected by continuously short pressing, the remote controlling device communicating the rhythm parameter to the speaker device at every predefined time interval, the speaker device automatically adjusting the second output lighting pattern based on the rhythm parameter included in the second parameter data.

18. The system according to claim 15, wherein the second pattern parameter is associated with a light shape, a light color, a light state, a light theme or a combination thereof.

19. A method for a real-time lighting interaction between a remote controlling device and a speaker device, the method comprising:

receiving a user request via the remote controlling device;

determining the user request for selecting a first lighting pattern from a plurality of lighting patterns included in a first mode or a second lighting pattern from a plurality of lighting patterns included in a second mode;

generating and communicating first parameter data associated with the selected first lighting pattern or second parameter data associated with the selected second lighting pattern, based on the determined user request; and adjusting a light show on the speaker device to output a first output lighting pattern associated with the first parameter data or a second output lighting pattern associated the second parameter data, in response to receiving the first parameter data or the second parameter data, wherein the user request is input via a user interface on the remote controlling device;

wherein the first lighting pattern in the first mode is selected by one of short pressing or sliding on the user interface, and the second lighting pattern in the second mode is selected by single short pressing, long pressing or continuously short pressing on the user interface, responsive to the first lighting pattern in the first mode being selected by short pressing or sliding, generating the first parameter data including a first pattern parameter associated with the selected first lighting pattern, and wherein the method further comprising:

responsive to the second lighting pattern in the second mode being by single short pressing, generating the second parameter data including a time parameter associated with a first threshold time and a second pattern parameter associated with the selected second lighting pattern;

responsive to the second lighting pattern in the second mode being selected by long pressing, generating the second parameter data including a time parameter associated with the first threshold time, a speed parameter indicating a lighting speed of the second output lighting pattern and a second pattern parameter associated with the selected second lighting pattern; or responsive to the second lighting pattern in the second mode being selected by continuously short pressing, the second parameter data is generated including a time parameter associated with the first threshold time, a second pattern parameter associated with the selected second lighting pattern and a rhythm parameter for the continuously short pressing.

* * * * *